July 7, 1925.
C E. LAWSON
HOLLOW CASING HITCH
Filed Nov. 16, 1923
1,544,660
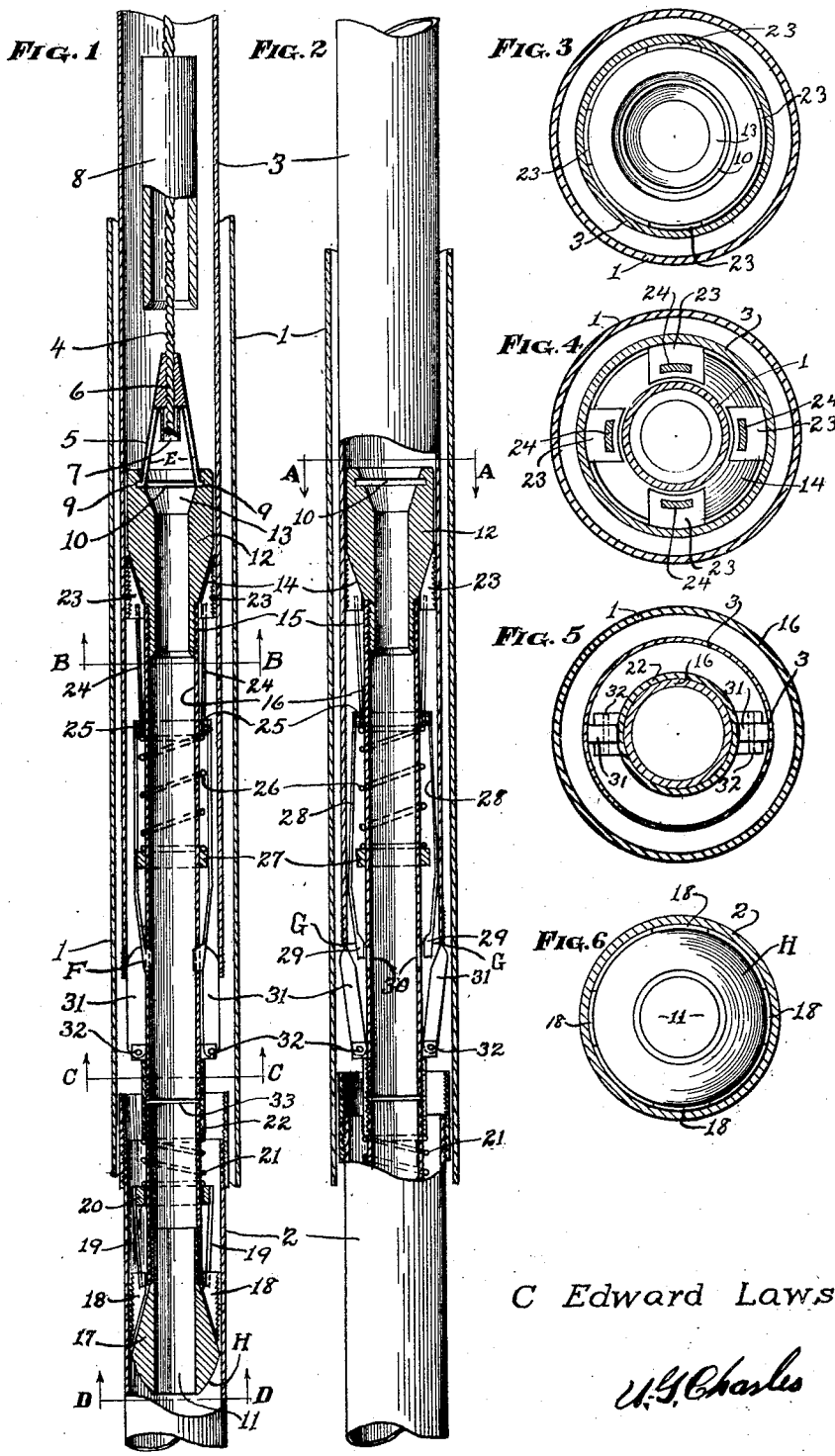
Inventor
C Edward Lawson Patented July 7, 1925.

1,544,660

UNITED STATES PATENT OFFICE.

C EDWARD LAWSON, OF GARBER, OKLAHOMA.

HOLLOW-CASING HITCH.

Application filed November 16, 1923. Serial No. 675,171.

*To all whom it may concern:*

Be it known that I, C EDWARD LAWSON, a citizen of the United States, residing at Garber, county of Garfield, and State of Oklahoma, have invented certain new and useful Improvements in Hollow-Casing Hitches, reference being had to the accompanying drawings, which form a part of this application.

My invention relates to a hollow casing hitch, for oil well purposes.

The objects of my invention are as follows;

First; to provide a casing hitch that is hollow, so that a charge of explosive may be lowered, and pass through the hitch to a desired point, and discharged.

Second; to provide a hitch that can be lowered to the bottom of a portion of the pipe line, and be firmly attached thereto, so that when that portion of the pipe is withdrawn the mechanism will automatically function as a fishing spear, drawing the adjoining casing as hereinafter described.

Third; to provide such a hollow casing hitch so that the cable lowering said hitch can be detached and withdrawn.

These and other objects will be more fully explained hereinafter.

Referring to the drawings;

Fig. 1 is a longitudinal section through the casing showing the position of the hitch, before being put into engagement.

Fig. 2 is a longitudinal view, part of the casing removed, showing the hollow casing hitch, engaged.

Fig. 3 is a sectional view on line A—A, looking in the direction of arrow.

Fig. 4 is a cross section on line B—B, looking in the direction of arrow.

Fig. 5 is a cross section on line C—C, looking in the direction of arrow.

Fig. 6 is a cross section on line D—D, looking in the direction of arrow.

1 is the top or large casing, as applied in an oil well, and 2 is the lower, or smaller sized casing, which is passed down through the casing 1. 3 is a casing to be used as a line for drawing the lower casings, and through said casing 3 is passed my hollow casing hitch, composed of parts as hereinafter described. 4 is a cable attached firmly to the bail 5, by the cable passing through as shown at 6, and entering a receptacle 7 in which Babbitt metal is poured to hold said cable firmly intact in the receptacle, the means of which is to lower said hitch to its proper location, and at which time the bail is detached by dropping a ferrule 8 over said cable so that when it is brought into engagement with the arms E of said bail, it will cause them to contract sufficiently to disengage lugs 9 from the annular groove 10, then the bail may be removed, and if a shot is required to sever the casing below said hitch, it can be passed downward through the hollow 11 and discharged without serious effect on the casing hitch. 12 is a top member being hollowed, and flared as at 13, and in said flare is an annular groove 10 to engage the arms 5, as heretofore described, and the said member 12 being bevelled as at 14 and threaded at 15, engaging in the end of a pipe 16 and on the opposite end of said pipe, and engaging firmly therein by threaded means, is a member 17 functioning as a cam. Equally stationed around said member 17 is a plurality of toothed members 18. 19 are springs connecting said tooth members to a collar 20, which is slidably mounted on said pipe 16. 21 is a spring engaging between said collar and the end of connection 22, said spring functioning as tension means to cause said tooth members 18 to start into an engagement with the inside walls of pipe 2, so that with the tension of an upward movement of my casing hitch, the said tooth members will cut into the metal of said casing for the purpose of withdrawing it from the well. On the opposite end of my hollow casing hitch are a plurality of tooth members 23, same being attached to bars 24, and the opposite end of said bars are firmly attached to a collar 25, said collar being slidably mounted on connecting pipe 16. 26 is a spring functioning as tension means between said collar 25 and a collar 27, which is rigidly attached to said pipe 16. 28 are arms rigidly attached to collar 25, and on the opposite end of said arms are lugs 29, said lugs adapted to engage in openings 30, holding said spring compressed and the said lugs are held in engagement in said openings 30, by arms 31, said arms being pivotally mounted at 32 and the said arms being of sufficient width that the casing 3 functions as binding means in conjunction with said arms to hold said lugs engaged as shown at F, until the said hitch ascends sufficiently for said arms to pass out of said casing as shown at G. When said lugs 29 disengage as shown in Fig. 2, allowing said spring 26 to expand, causing the toothed members 23 to slide on the bevelled surface 14, placing said members in a position to engage with the inside walls of pipe 3, so that when said pipe is raised, the said toothed members will engage firmly by cutting into the metal of said pipe, as they ascend on said bevel or cone 14. My hollow casing hitch is then firmly attached to the casing line hereto referred to, functioning as the line for drawing the casing 2 from the well and in the ascent the arms 31 will slide on the walls of casing 1, or should the said arms become disengaged by passing the said arms may follow the walls of the hole as drilled or protrude into the earth, and reverse their position from the pivoted connection, without obstructing the capacity of the hitch, but such action may occur only in the case of a broken connection or a severed casing, the ends being in close proximity to each other, and in such case the hitching of the two lines would take place in like manner to that shown in the drawings.

When my casing hitch is being lowered, it is shown that the lower end of member 17 is cone shaped as at H, so that it will pass freely over joints or exposed ends of casings, and the bevelled opening 13, in member 12 functions for two purposes, first to receive the charge that is being lowered for the purpose heretofore described, and second, as means for entering the arms of bail 5, so that lugs 9 will engage in the annular groove 10.

When the casing is drawn, and it is desired to disengage the hitch, said hitch can be separated at the joint 33, then both ends can be drawn through the casings in opposite direction, disengaging the toothed members heretofore referred to, then the parts may be reassembled, and the casing hitch is again ready for action. It will be understood that the casing hitch as described functions as a link to connect the adjacent ends of the casing, and the toothed members on each end thereof, work in conjunction with each other connecting the two pipes, and the toothed members 23, engage with the pipe when the arms 31 have passed out through the end of the pipe, at which time the hitch is prevented from further descent, and the toothed members 18 on the opposite end are adapted to engage firmly with the casing when the ascent is made.

Such modifications may be employed as lie within the scope of the appended claims and having thus described my invention, what I claim as new and desire to claim by Letters Patent is;

1. In a hollow casing hitch, a hitch adapted to connect the adjoining ends of two casings by sliding said hitch downward until the opposite ends of said hitch are interposed within the ends of said casings, a plurality of toothed members slidably mounted and being tensioned by springs so that said toothed members will expand binding the ends of said hitch in the adjacent ends of the casings, hitching said casings together, a bail swiveled in the end of said hitch, a hollow pipe adapted to engage over said bail so that by gravity force the said bail is disengaged for removal, and the said top casing functions as a line to draw the casing attached to the opposite ends of said hitch from the well, and means for disconnecting said hitch as convenient means for removing said hitch from the well.

2. In a hollow casing hitch, a pipe connecting cone members functioning as cams, a plurality of toothed members supported by arms, and said arms being firmly attached to a collar which is slidably mounted on the shaft 16 of said hollow casing hitch, anchor arms 28 attached to said ring, means for attaching said arms to said shaft so that said cams may not expand, and means for disengaging said arms from said shaft, a collar 27, rigidly attached, a spring seated on said collar functioning as tension means to cause said toothed members to expand for the purpose set forth and described, and on the opposite end of said hitch a plurality of toothed members 18 being connected by arms 19 to collar 20 slidably mounted on a shaft and a spring interposed between said collar and the end of a connection 22 as tensioning means to expand said toothed members as they travel on the cone of said member 17, for the purpose set forth and described.

3. In a hollow casing hitch, a bail, a cable connected to said bail as means for suspending said mechanism to a determined location, means for detaching said bail and removing same from the casing, an unobstructed hollow longitudinally through said casing hitch functioning as means for passing a charge of explosive through and below said casing hitch, an automatic means for fastening one end of said hitch in the end of the oil well casing, and the opposite end released for engagement by binding arms passing below the end of the casing allowing said anchor arms 28 to disengage, and yielding to the tension of said spring 26, for the purpose set forth and described.

C EDWARD LAWSON.